United States Patent
Tanita et al.

(10) Patent No.: US 7,422,797 B2
(45) Date of Patent: Sep. 9, 2008

(54) PLATING LAYER FOR SLIDING PORTION

(75) Inventors: Yoshio Tanita, Hiroshima (JP); Shinji Kadoshima, Hiroshima (JP); Satoshi Nanba, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 143 days.

(21) Appl. No.: 11/305,125

(22) Filed: Dec. 19, 2005

(65) Prior Publication Data

US 2006/0151329 A1  Jul. 13, 2006

(30) Foreign Application Priority Data

Jan. 12, 2005  (JP)  ............... 2005-005268
Aug. 23, 2005  (JP)  ............... 2005-240695

(51) Int. Cl.
- *B32B 15/01* (2006.01)
- *B32B 15/04* (2006.01)
- *B32B 15/18* (2006.01)

(52) U.S. Cl. ............ 428/613; 428/666; 428/667; 428/687

(58) Field of Classification Search ......... 428/612, 428/613, 666, 667, 651, 652, 653, 687, 220, 428/332

See application file for complete search history.

(56) References Cited

U.S. PATENT DOCUMENTS

| 4,039,399 A | 8/1977 | Wallace et al. |
| 4,729,729 A | 3/1988 | Tarumoto et al. |
| 5,196,108 A | 3/1993 | Wilmeth et al. |
| 6,235,413 B1 * | 5/2001 | Dosaka et al. ............ 428/687 |
| 2003/0121794 A1 | 7/2003 | Horsthemke |

FOREIGN PATENT DOCUMENTS

| EP | 1 253 220 A1 | 10/2002 |
| GB | 2153387 A | 8/1985 |
| JP | 10-148155 | 6/1998 |

OTHER PUBLICATIONS

European Search Report, Mar. 3, 2006.

* cited by examiner

*Primary Examiner*—Michael La Villa
(74) *Attorney, Agent, or Firm*—Studebaker & Brackett PC; Donald R. Studebaker

(57) ABSTRACT

In forming a plating layer for a sliding portion, which comprises Cr that is electrolytically-deposited in a plating bath containing Cr, the plating bath contains organic sulfonic acid. Accordingly, micro-cracks are formed at the plating layer. The plating layer for a sliding portion has the superior low friction and lubricating property.

7 Claims, 18 Drawing Sheets

Catalyst 30 ml/L (early stage)

HCP-structure & BCC-structure d (110)    d (200)    d (211)

CrMo Plating (catalyst content 0 ml/L)

CrMo Plating (catalyst content 10 ml/L)

CrMo Plating (catalyst content 20 ml/L)

CrMo Plating (catalyst content 30 ml/L)

Cr Plating (catalyst content 0 ml/L)

Cr Plating (catalyst content 10 ml/L)

Cr Plating (catalyst content 20 ml/L)

Cr Plating (catalyst content 30 ml/L)

Catalyst 0 ml/L (early stage)

BCC-structure

Catalyst 30 ml/L (early stage)

HCP-structure & BCC-structure

Catalyst 30 ml/L (after grinding)

▼ Cr(574.4)
▽ Cr2O3(576.8)(Cr3+)
▿ CrO3(579.8)(Cr6+)

50.00 μm 50.00 μm

Cracks formed in early stage

Micro-Cracks appearing at Sliding Surface

Micro-Cracks appearing at Sliding Surface

PLATING LAYER FOR SLIDING PORTION

BACKGROUND OF THE INVENTION

The present invention relates to a plating layer for a sliding portion and a method for forming the same.

It is known that some treatments are applied to the trochoidal surface of the rotor housing forming the combustion chamber of the rotary piston engine. The apex seals of the engine slide on this trochoidal surface of the housing. Herein, the chromium molybdenum (CrMo) alloy plating layer with hardness of about Hv1000 is formed on this trochoidal surface for the superior wear resistance, and the first reverse current treatment is applied soon after the plating, and then the second reverse current treatment is applied after the honing in order to form micro-cracks at the surface for the improvement of the lubricating property by enhancing lubricating-oil retaining property (see U.S. Pat. No. 4,729,729).

It is also known that the composite chromium plating layer is formed on the cylinder liner of the reciprocating engine by applying the direct/reverse current treatments repeatedly in the chromium bath containing hard particulates and then by applying the honing (see Japanese Patent Laid-Open Publication No. 10-148155). Accordingly, the inner surface of the cylinder liner is formed with the maximum roughness of 3 μm, the porosity of 5% or less and the average depth of 0.01 mm or less.

Further, another treatment for the sliding member, such as piston rings of the internal combustion engine, have been proposed (see EP Patent Application No. 1253220 A1). Herein, the sliding member has a plurality of hard Cr plating layers laminated thereon, wherein the individual hard Cr plating layer has fine cracks formed at the surface and the fine cracks form fine voids being independent in the direction of film formation. The plating layer surface has the porosity of 0.5 to 4.5% and the number of micro-cracks of 50 to 1200 per 10 mm length.

Meanwhile, in order to obtain an appropriate hardness, the Cr plating, such as the chromium molybdenum alloy plating or the hard chromium plating, needs to be conducted with treatment of the low temperature and low current density. For example, the direct current treatment of 6.5 hours is required for the rotor housing to form the plating layer of 150 μm film thickness. This is, however, a factor of increasing parts cost that would deteriorate the productivity. Also, the above-described treatment with the second reverse current treatment after the honing causes complicate treatments that would be disadvantageous in the productivity and the costs reduction. Further, this would cause an improperly rough finish eventually. Because the final roughness of the surface to be treated is affected by the previous treatments of the first current treatment and the honing as well. Thus, this treatment also has a problem that the final product would have a poor quality.

Also, although sulfuric acid in the normal hard chromium plating (Sargent bath) functions as a catalyst to deposit Cr in the plating bath and the micro-cracks can be formed at the surface by applying the reverse current treatment to the deposited plating layer, the width of the opening of cracks is 5 μm or more and the crack's number per a unit length is 100/cm or less.

Although the width of the opening of cracks could be reduced by adjusting conditions of the reverse current treatment (reducing the current density or shortening the treatment time) and thereby reducing the amount of removed plating, this should be difficult in fact. Because, the width of the opening of cracks is generally influenced by the inner stress of the plating layer, and the plating layer formed in the conventional Sargent bath has the high internal stress. Therefore, once the cracks occur, the width of the opening would remain 5 μm or more. Meanwhile, the converse adjustment of conditions of the reverse current treatment (increasing the current density or prolonging the treatment time) to increase the amount of removed plating could promote the width of the opening of cracks. However, since the number of cracks depends on the internal stress of the plating layer, there is actually its limit of 100/cm.

The cracks with the wide opening width and the small number could not retain the lubricating oil properly on the surface of the plating layer because the lubricating oil easily goes into the cracks, and thereby the seizure tends to occur and the fuel consumption of the engine would increase due to an increased friction loss at the sliding surface.

Meanwhile, although the above-described publication discloses the plating layer forming to provide many cracks, repeated treatments of the direct and reverse current treatments are required and the adjustment of current density would be difficult actually.

SUMMARY OF THE INVENTION

The present invention has been devised in view of the above-described problems. An object of the present invention is to obtain a plating layer for a sliding member having the low friction and the superior lubricating property. Another object is to shorten the treatment time to obtain such a plating layer for a sliding member and to improve the product quality.

According to the present invention, there is provided a plating layer for a sliding portion, which comprises Cr that is electrolytically-deposited in a plating bath containing Cr, wherein the plating bath contains organic sulfonic acid, the plating layer has many micro-cracks formed at the surface thereof, and the surface of the plating layer has more than 1 of an intensity ratio of a X-ray diffraction peak of (200) plane of Cr crystal with BCC-structure relative to that of (211) plane of Cr crystal with BCC-structure.

Namely, at the surface of the plating layer comprising Cr appears the Cr crystals with BCC-structure having various different orientations, namely, having the (211) plane, (200) plane and others. Herein, the organic sulfonic acid functions as a catalyst to promote deposition of Cr at the work surface as the plating layer by resolution of chromic acid in the plating bath. Accordingly, the intensity ratio of the diffraction peak of the (200) plane relative to that of the (211) plane becomes more than 1, which is different from a case where no organic sulfonic acid is contained. This means that Cr crystals having the orientation of the (200) plane exist dominantly at the surface of the plating layer. Thus, the friction between the member with this plating layer and another member becomes small.

More specifically, the surface of the plating layer comprising Cr is covered by a film of chrome oxide by oxidization, which has sliding contact with another member. Herein, the chrome oxide adheres to the another member, and thereby the shearing force to peel the chrome oxide from the plane of Cr crystal occurs as the friction between them. Meanwhile, the Cr crystal planes have different plane distances d, respectively.

FIG. 1 illustrates respectively the distance between planes d (100), d (200) and d(211) of the (110) plane, (200) plane and (211) plane of the crystal with BCC-structure. Herein, d(200) =2.08 Å and d(211)=1.39 Å, wherein the plane (200) has its longer plane distance d than the plane (211). This means that the sticking force of the chrome oxide film to the plating layer (Cr crystal plane) at the (200) plane is weaker than that at the (211) plane. Namely, this sticking force depends on the interconnection between a Cr atom of the plating layer and an oxygen atom of the chrome oxide, and the greater the plane distance d is, the longer the distance between the Cr atom and the oxygen atom inside the (200) plane is. As a result, the interaction becomes weak.

Thus, the sticking force of the chrome oxide at the (200) plane is weaker than that at the (211) plane, which means the chrome oxide film formed at the crystal planes peals easily. Accordingly, the present invention in which the Cr crystal having the (200) orientation is dominant can provide the properly smaller friction between them.

Herein, it is more preferable that the above-described peak intensity ratio is 1.25 or more with the upper limit of 1.8 or 2.0 or less. When the peak intensity ratio is more than 2, the chrome oxide comes to peal extremely easily, so that the plating layer would wear off too much and there would occur seizure between the Cr crystal plane (meal plane) and another member. To avoid these problems, the peak intensity ratio is preferably less than about the above-described upper limit.

Also, since many micro-cracks are formed at the plating layer surface, the frictional heat generated at the sliding surface is properly dispersed into the lubricating oil retained within these micro-cracks, thereby preventing the improper local temperature increase. The lubricating oil properly retained within many micro-cracks can also prevent the lubricating oil film from being broken, thereby reducing the friction loss.

It is preferable that the organic sulfonic acid is $HSO_3R$, wherein R denotes the aromatic hydrocarbon group with one aromatic ring combined by non-cyclic hydrocarbon, such as the aliphatic hydrocarbon group with less than 10 of carbon such as the methyl group or the ethyl group, toluene having the methyl group in para-position, or styrene having the unsaturated hydrocarbon group. Herein, R may be another type of aromatic hydrocarbon group, and the organic sulfonic acid may have a plurality of sulfuric acid group ($HSO_3$).

According to another embodiment of the present invention, the plating bath further contains Mo, and the plating layer comprises CrMo alloy.

Herein, the fineness of crystal, the strength and the heat resistance of the plating layer can be improved by Mo, thereby providing the superior lubricating property and seizure resistance, and the lower friction. It is preferable that the deposition ratio of Mo is 0.3% or more and 1.0% or less.

According to another embodiment of the present invention, the surface of the plating layer has cracks exposed thereon, whose the width is 0.1 µm or more and 3 µm or less and whose the number per a unit length is 400/cm or more and 1300/cm or less.

The organic sulfonic acid functioning as the catalyst described above increases the deposition speed of Cr at the work surface, so that many micro-cracks emerge at the plating film as the plating layer is growing. In other words, since the Cr deposition happens at the high speed, the internal residual stress generated during the crystal growth is released so promptly that many micro-cracks with the small width and the number of 400/cm to 1300/cm are formed.

Because of many micro-cracks being formed at the plating layer surface, the frictional heat generated at the sliding surface is properly dispersed into the lubricating oil retained within these micro-cracks, thereby preventing the local temperature increase. The lubricating oil properly retained within many micro-cracks can also prevent the lubricating oil film from being broken, thereby reducing the friction loss.

Also, even if the plating layer surface is worn off, the cracks located inside come to appear at the layer surface. The proper lubricating property can be maintained.

Herein, the greater width of cracks functioning as lubricating oil sumps would make the lubricating oil on the sliding plane (plating layer surface) flow into the cracks easily. According the present invention, however, the width of the cracks is narrow, i.e., 0.1 µm or more and 3 µm or less. Thus, the lubricating oil flowing into the cracks from the sliding plane can be properly prevented, thereby providing the superior lubricating property and seizure resistance.

According to another embodiment of the present invention, the plating layer surface is ground.

Thereby, the roughness of the plating layer surface is properly adjusted so that the lubricating oil film can be prevented from being broken in the early stage. Also, the proper adjustment of the cracks exposed on the plating layer surface can improve the lubricating property. It is preferable, for example, that the surface roughness Ra is 2.0 µm or less.

According to another embodiment of the present invention, the plating layer surface further has cracks exposed thereon, whose the width is less than 0.1 µm and whose the number per a unit length is 1500/cm or more and 3000/cm or less.

Herein, these extremely-micro cracks can further enhance the lubricating-oil retaining property on the plating layer surface, namely, the lubricating oil film can be prevented from being broken properly, thereby providing the superior seizure resistance and the reduced sliding resistance or friction.

According to another embodiment of the present invention, the cracks with the width of 0.1 µm or more and 3 µm or less cover an area of 3% or more and 20% or less of a whole area of the surface of the plating layer.

It is preferable that the area of the cracks covering in the whole area of the plating layer surface is 3% or more in terms of the proper lubricating-oil retaining property without the seize. Also, the crack area is preferably 20% or less because its too large area would allow the lubricating oil to flow into the cracks easily and thereby the lubricating oil film would be broken.

According to another embodiment of the present invention, the plating layer has fine Cr crystal particles with HCP-structure dispersed therein, which is operative to induce micro-cracks formed at the surface of the plating layer through grinding or sliding contact with another member, and X-ray diffraction peaks of (10·0) plane and (10·3) plane of the Cr crystal particles are detected.

The above-described 1 or more intensity ratio of the X-ray diffraction peak of the (200) plane relative to that of the (211) can provide the small friction between the sliding members as described above. Further, according to the above-described constitution, the fine Cr crystal particles with HCP-structure are dispersed in the plating layer and induce extremely-micro-cracks formed at the surface of the plating layer through grinding or sliding contact.

Namely, the organic sulfonic acid functioning as the catalyst described above increases the deposition speed of Cr at the work surface, so that the micro-cracks emerge at the plating film in addition to the Cr crystal with BCC-structure. Meanwhile, the organic sulfonic acid functioning as catalyst allows the internal residual stress generated during the Cr crystal growth to be released promptly, so that many micro-cracks emerge at the plating layer. Herein, this releasing of the internal stress occurs over a whole area, but the internal stress is located intensively at a particular area where the fine crystal particles with HCP-structure exist. Accordingly, when an outer force acts through grinding or sliding contact, the fine crystal particles with HCP-structure change their shape and then vanish. Namely, the extremely-micro cracks emerge at the plating layer surface at the area where the change of the crystal structure occurs, and thereby the internal stress comes to be released.

Thus, even if the plating layer surface is worn off by the sliding contact with another member, the crystal particles with HCP-structure come to appear at the layer surface and then new cracks emerge according to the change of the crystal form. Thereby, the deterioration of the lubricating oil retaining property is prevented, so that the proper lubricating property can be maintained.

According to another embodiment of the present invention, the plating bath further contains Mo and the plating layer comprises CrMo alloy, the plating layer has fine Cr crystal particles with HCP-structure dispersed therein, which is operative to induce micro-cracks formed at the surface of the plating layer through grinding or sliding with another member, and X-ray diffraction peaks of (10·0) plane and (10·3) plane of said Cr crystal particles are detected.

Accordingly, the fineness of crystal, the strength and the heat resistance of the plating layer can be improved by Mo, thereby providing the superior lubricating property and seizure resistance, and the lower friction. It is preferable that the deposition ratio of Mo is 0.3% or more and 1.0% or less. Also, as described above, the fine Cr crystal particles with HCP-structure are dispersed in the plating layer and the extremely-micro cracks induced by these crystal particles emerge at the plating layer surface through grinding or sliding contact. As a result, the superior lubricating oil retaining property can be obtained. In particular, the new extremely-micro-cracks emerge despite the wear the plating layer surface by the sliding contact with another member, so the proper lubricating property can be maintained for a long term.

According to another embodiment of the present invention, the plating layer is formed on a member exposed to a combustion chamber of an internal combustion engine, and another member slides on the plating layer formed on the member.

Herein, the member exposed to the combustion chamber of the internal combustion engine can be, for example, the trochoidal surface of the rotor housing of the rotary piston engine or the sliding surface of the apex seals sliding on the trochoidal surface. Or, it can be the cylinder bore surface of the reciprocating engine or the sliding surface of the piston rings sliding on the cylinder bore surface. Forming the above-described plating layer on these surfaces can reduce the friction loss to improve the fuel efficiency and improve the seizure resistance to provide the high power and the superior durability.

Further, according to the present invention, there is provided a method for forming a plating layer for a sliding portion, comprising the steps of applying a direct current treatment, in which a plating layer comprising CrMo alloy is formed on the surface of a work by using a plating bath containing Cr, Mo and organic sulfonic acid, applying a reverse current treatment, in which etching is applied to the plating layer, and applying grinding to the surface of the etched plating layer.

Accordingly, the forming of the plating layer with the direct current treatment can be carried out in a short period of time, and the sliding surface with the low friction and the superior seizure resistance can be formed without the second reverse current treatment, thereby providing the stable quality and the low manufacturing costs.

Namely, the organic sulfonic acid functions as catalyst in the above-described direct current treatment and increases the deposition speed of CrMo alloy at the work surface, so that many micro-cracks with the narrow width emerge not only on the plating film surface but also inside the plating layer. Also, since this deposition happens at the high speed, the crystal growing manner becomes different from the case of no organic sulfonic acid added, so the distribution of the internal residual stress generated in this plating layer differs from that in the conventional plating layer. As a result, the releasing manner of this internal stress during the plating layer surface being removed by etching with the reverse current treatment also changes, so many micro-cracks with the narrow width are formed in the plating layer. Herein, the etching causes an enlargement of the width of the opening of cracks that are generated during the growth of plating layer. Accordingly, just finishing of the plating layer surface by grinding can provide the sliding surface having the proper oil sumps.

Also, since the crystal deposition speed is high as described above, the fine crystal particles with HCP-structure, which generate the extremely-micro-cracks at the plating layer surface through the grinding or sliding contact with another member, are dispersed in the plating layer in addition to the Cr crystal with BCC-structure.

Herein, it is preferable that the content of the organic sulfonic acid in the plating bath is 10 ml/L or more and 35 ml/L, which can provide the deposition speed that is more than twice as high as that in the case of no organic sulfonic acid.

Other features, aspects, and advantages of the present invention will become apparent from the following description which refers to the accompanying drawings

BRIEF DESCRIPTION OF THE INVENTION

DETAILED DESCRIPTION OF THE INVENTION

Hereinafter, preferred embodiments of the present invention will be described referring to the accompanying drawings.

Figure 2:
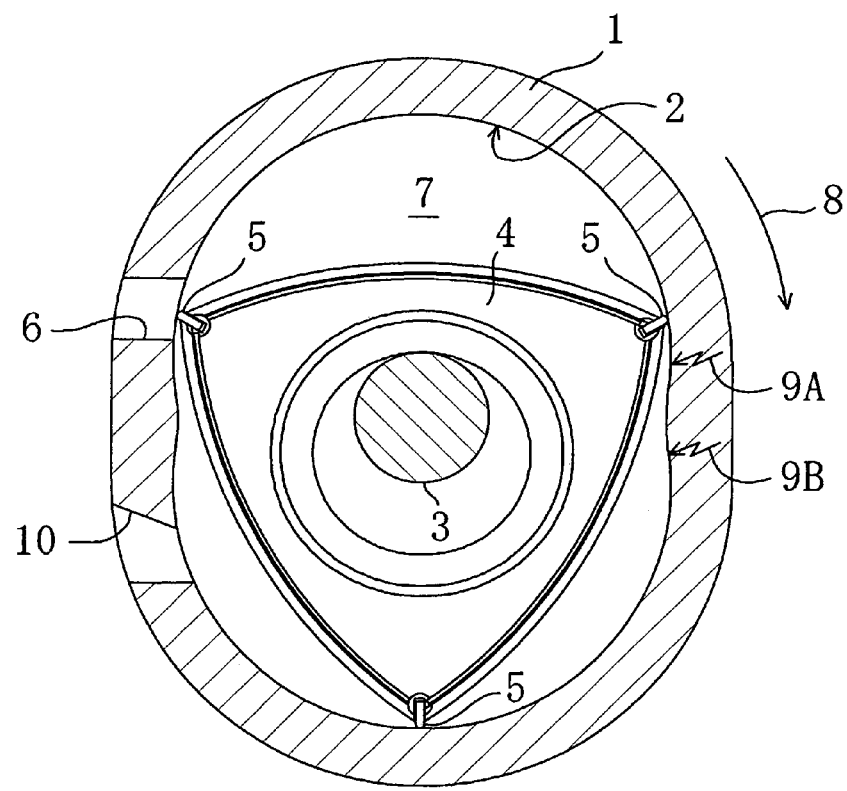
FIG. 2 is a schematically sectional view of a rotary piston engine.

FIG. 2 is a schematic view of a rotary piston engine according to the embodiment, in which apex seals provided at each apex of a rotor 4 to rotate an eccentric shaft 3 slide on a trochoidal surface 2 of a rotor housing 1. In this engine, the mixture of fuel and air containing lubricating oil is taken into a working chamber 7 through an intake port 6, and it is compressed and moved in a direction of an arrow 8 according to the rotation of the rotor 4 and then ignited by ignition plugs 9A, 9B. The combustion gas generates the pressure operative to rotate the eccentric shaft 3, and then is exhausted through an exhaust port 10. This cycle is repeated.

Figure 3:
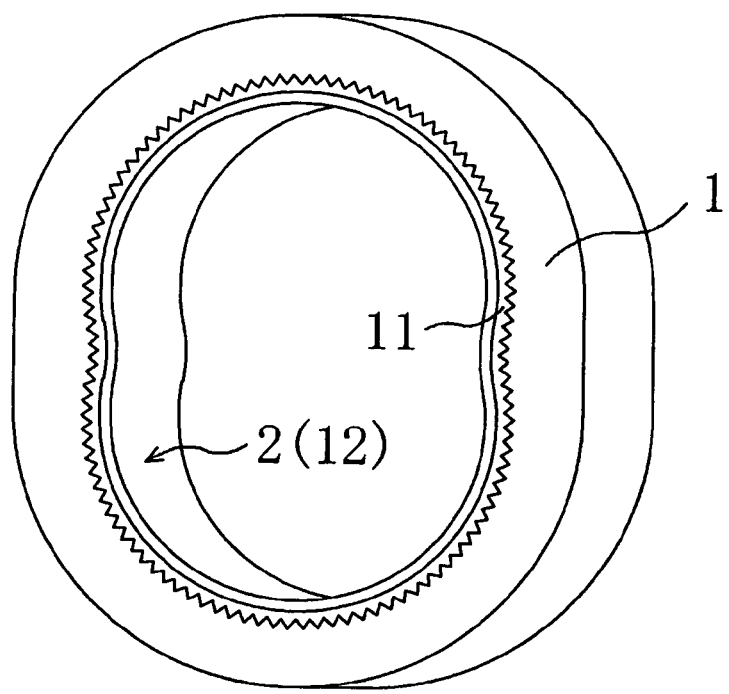
FIG. 3 is a perspective view of a rotor housing.
Figure 4:
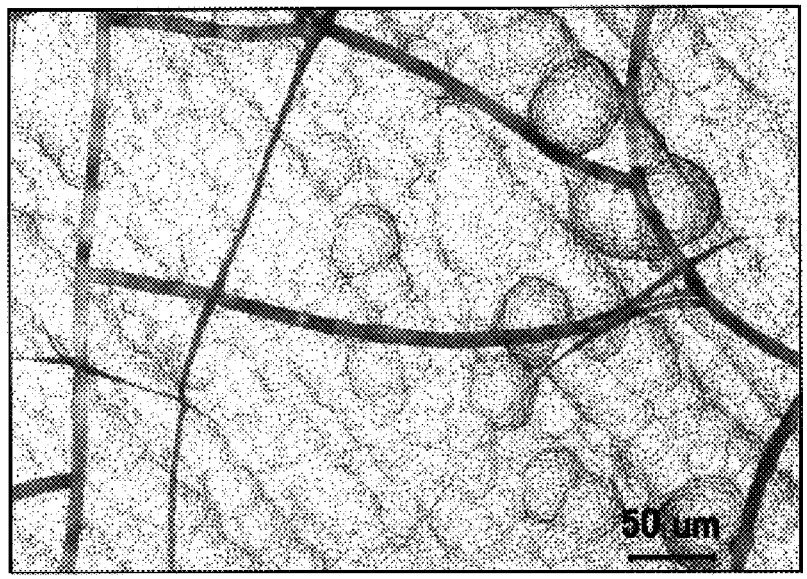
FIG. 4 is a photomicrograph of a CrMo plating layer formed with a zero content of catalyst.
Figure 5:
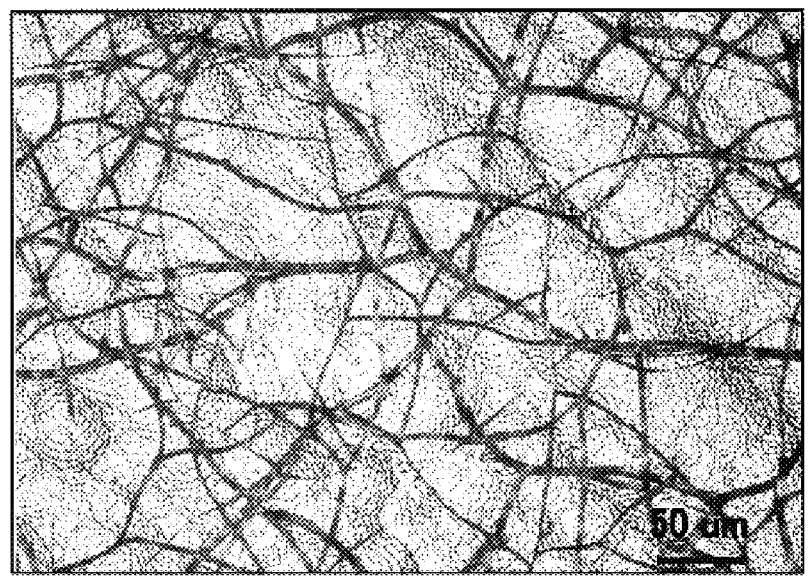
FIG. 5 is a photomicrograph of a CrMo plating layer formed with a 10 ml/L content of catalyst according to the present invention.
Figure 6:
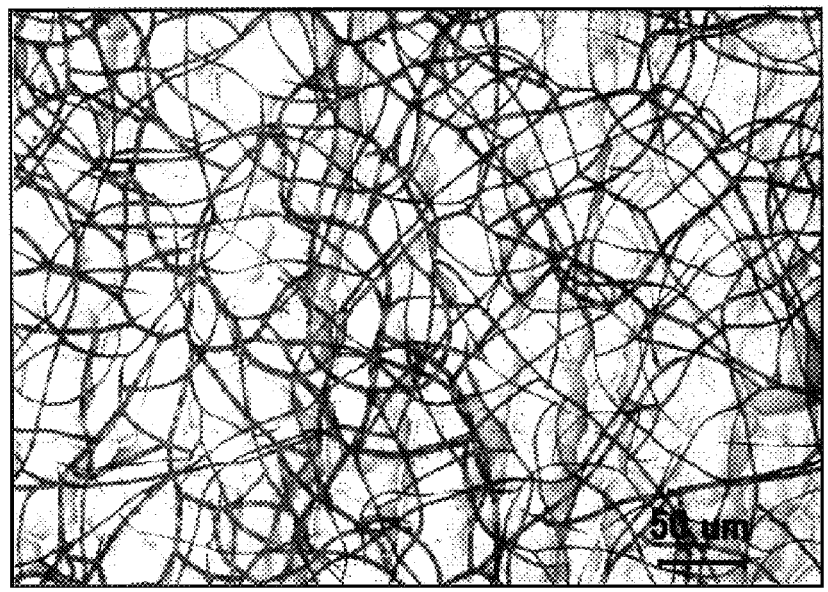
FIG. 6 is a photomicrograph of a CrMo plating layer formed with a 20 ml/L content of catalyst according to the present invention.
Figure 7:
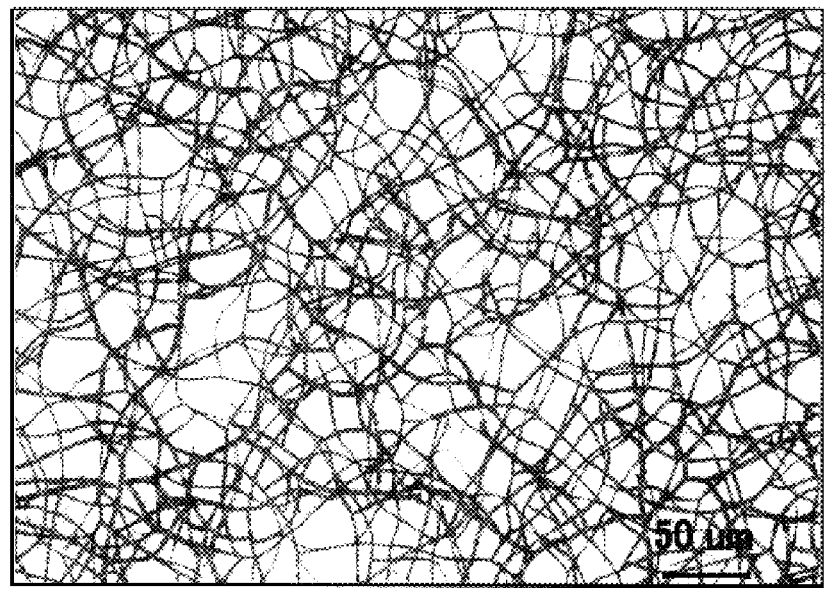
FIG. 7 is a photomicrograph of a CrMo plating layer formed with a 30 ml/L content of catalyst according to the present invention.

As illustrated in FIG. 3, the rotor housing 1 is formed with a liner 11 that may be made of a sheet of a high tension steel and formed at the inner surface with the trochoidal surface 2 and at the outer surface with serrations, with aluminum housing body being cast outside the liner 11. The inner trochoidal surface 2 of the liner 11 requires the superior heat resistance and wear resistance and the low friction property for a proper sliding contact with the apex seals 5. Accordingly, the trochoidal surface 2 has a Cr or CrMo alloy plating layer 12 formed thereon. The surface of this plating layer has cracks exposed thereon, whose the width is 0.1 μm or more and 3 μm or less and whose the number per a unit length 1 cm is 400/cm or more and 1300/cm or less. The cracks cover an area of 3% or more and 20% or less of a whole area of the surface of the plating layer.

Also, the surface of this plating layer further has cracks exposed thereon, whose the width is less than 0.1 μm and whose the number per a unit length 1 cm is 1500/cm or more and 3000/cm or less.

Further, the surface of this plating layer has more than 1 of an intensity ratio of a X-ray diffraction peak of (200) plane of Cr crystal with BCC-structure relative to that of (211) plane of Cr crystal with BCC-structure.

Hereinafter, fine cracks whose the width is 0.1 μm or more and 3 μm or less are called micro-cracks, and fine cracks whose the width is less than 0.1 μm are called extremely-micro-cracks.

<Method for Forming Plating Layer>

A work is put into a plating bath containing Cr, organic sulfonic acid that functions as sulfuric acid and catalyst, and, if necessary, Mo. The work is preheated to a specified temperature and then the reverse current treatment is applied for some minutes to clean the work surface. After that, the some-minute-period strike plating treatment (direct current treatment), the some-hour-period main plating treatment (direct current treatment), the some-minute-period reverse current treatment (crack forming), and finishing treatment are applied in order. Thus, the plating layer for a sliding portion is formed.

Herein, chromic acid anhydride $CrO_3$ is preferably used as Cr. Also, sodium molybdate or ammonium molybdate may be used as Mo. The plating bath may contain the chromic acid anhydride of 240 g/L or more and 280 g/L or less, the amount of sulfuric acid ion of 2.5 g/L or more and 3.3 g/L or less, the organic sulfonic acid of 10 ml/L or more and 35 ml/L or less, and the ammonium molybdate of 50 g/L or more and 65 g/L or less. The bath temperature may be adjusted between 50 to 60° C.

The current density of the cleaning reverse current treatment may be 50 $A/dm^2$ or more and 60 A/dm or less, the current density of the strike plating treatment may be 40 $A/dm^2$ or more and 55 $A/dm^2$ or less, the current density of the main plating treatment may be 40 $A/dm^2$ or more and 55 $A/dm^2$ or less, and the current density of the reverse current treatment for forming cracks may be 30 $A/dm^2$ or more and 45 $A/dm^2$ or less. The finishing treatment may be preferably applied in such a manner that a flat portion (non-crack portion) on the plating surface is Ra 2.0 μm or less.

<Relationships Between the Catalyst Content and the Micro-Cracks Number>

The CrMo plating layer was formed on the surface of the steel work by changing the content of catalyst (organic sulfonic acid) in the plating bath. Namely, as shown in Table 1 below, the catalyst content was changed from 0 to 30 ml/L. Herein, Heef 25-R produced by Atotech Corporation was used as the catalyst, the organic sulfonic acid. Plating conditions shown in Table 2 below was used. Herein, the "strike" is a short-period plating to increase the sticking force of the plating layer on the work surface, and "$A/dm^2$" means the current density and time means the treatment period of time.

The thickness of plating layer is 150 μm. In Table 1, the deposition ratio of Mo of the CrMo alloy is 0.55%.

TABLE 1

Plating bath composition

| | |
|---|---|
| $CrO_3$ | 260 g/L |
| $H_2SO_4$ | 2.9 g/L |
| $Na_2MoO_4$ | 60 g/L |
| $Cr_2O_3$ | 4 g/L |
| $Fe^{3+}$ | 5 g/L or less |
| Organic sulfonic acid | 0-30 ml/L |

TABLE 2

Plating conditions

| | |
|---|---|
| Preheating (55° C. bath temperature) | 3 minutes |
| Reverse current (for cleaning) | 56.6 A/dm² × 3 minutes |
| Strike | 48.5 A/dm² × 2 minutes |
| Direct current (main plating) | 50.0 A/dm² × 3.0 hours |
| Reverse current | 30.3 A/dm² × 3.5 minutes |

Figure 8:
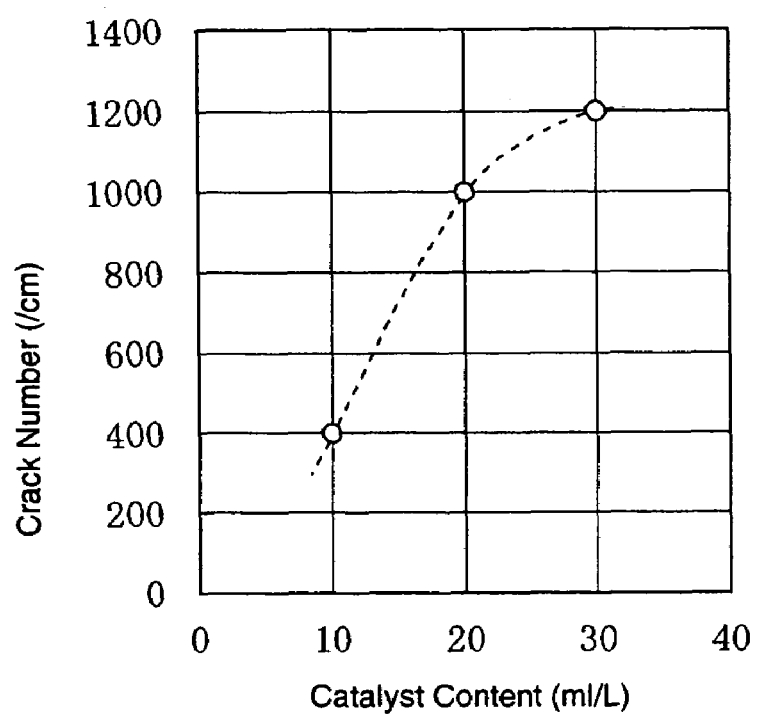
FIG. 8 is a graph showing relationships between the content of catalyst and the number of cracks according to the present invention.
Figure 9:
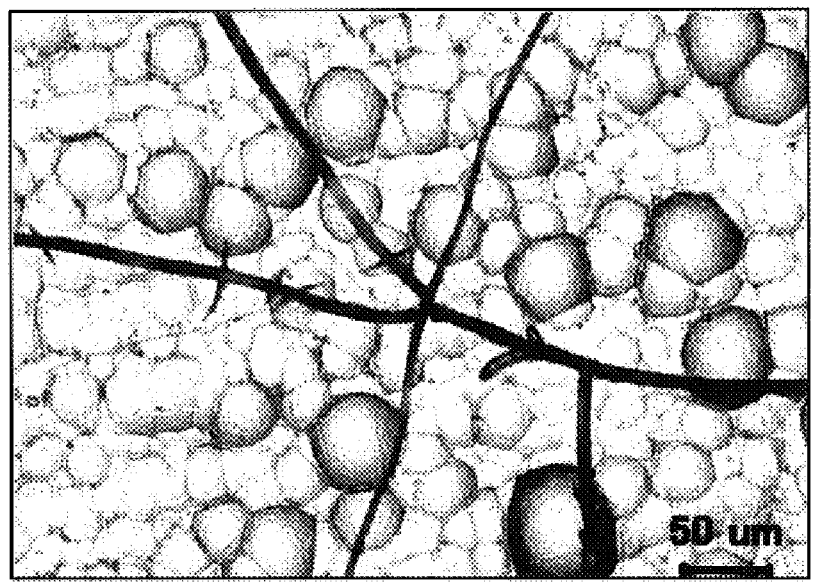
FIG. 9 is a photomicrograph of a Cr plating layer formed with a zero content of catalyst.
Figure 10:
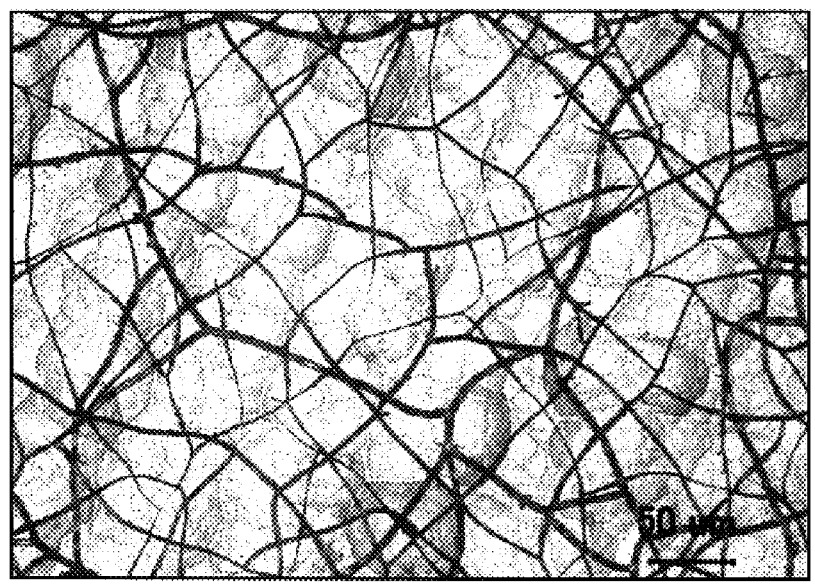
FIG. 10 is a photomicrograph of a Cr plating layer formed with a 10 ml/L content of catalyst according to the present invention.
Figure 11:
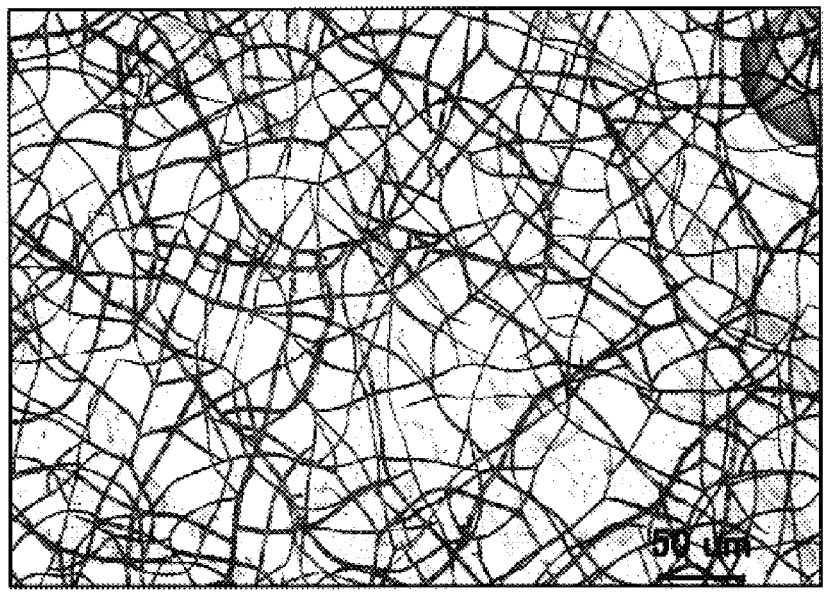
FIG. 11 is a photomicrograph of a Cr plating layer formed with a 20 ml/L content of catalyst according to the present invention.
Figure 12:
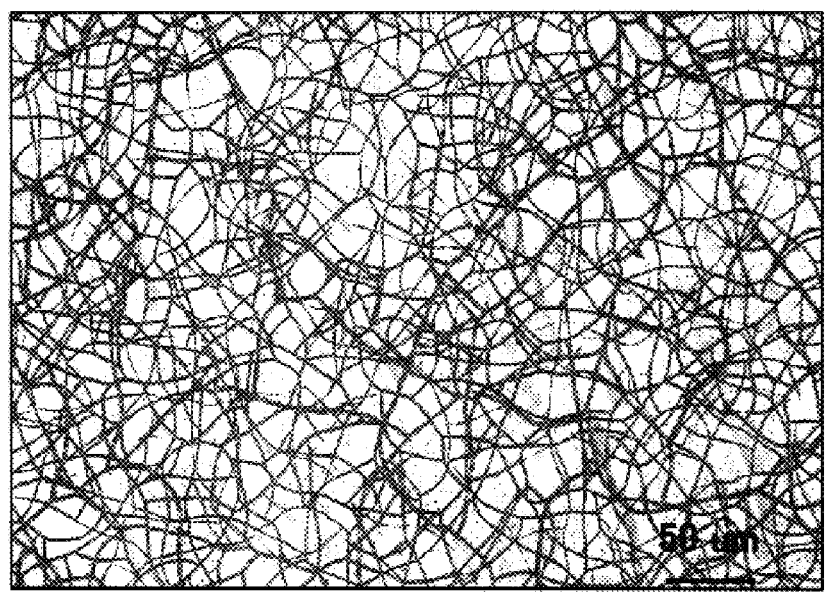
FIG. 12 is a photomicrograph of a Cr plating layer formed with a 30 ml/L content of catalyst according to the present invention.

FIGS. 4 through 7 are photomicrographs of the CrMo plating layers formed with zero, 10 ml/L, 20 ml/L and 30 ml/L content of catalyst. The greater the catalyst content is, the narrower the crack width is and the more the number of cracks is. The number of cracks per a unit length 1 cm of the straight line of the CrMo plating layer formed by adding the catalyst is shown in FIG. 8. It is apparent from this that the crack number is 400-1200/cm for the catalyst content of 10-30 ml/L.

The reason why many micro-cracks are formed at the plating layer is that the deposition speed is increased by the catalyst function of the organic sulfonic acid to promote the deposition of Cr in the plating bath and thereby the cracks are formed under the growth of the plating layer. Namely, the Cr deposition is done at a high speed, so the release of stress happens so promptly and the cracks become very small. Also, according to this high-speed deposition, the location of the internal residual stress in the plating layer differs from the conventional plating layer, and the releasing manner of the internal stress, which occurs when the plating layer surface is removed by etching with the reverse current treatment step (first reverse current) following the direct current treatment step, changes. Thereby, the cracks made small properly.

Also, in the plating method of the present invention, the density of cracks may be properly adjusted by changing the catalyst content or the plating conditions (bath composition, current density, bath temperature).

Meanwhile, according to the conventional plating method in which the plating layer is formed without the catalyst and additional second reverse current treatment is applied after the finishing grinding treatment, while the cracks may be formed at the plating layer surface with etching by the second reverse current treatment, the width of the opening of cracks would be wide, 5 μm or more, and the crack number would be 100/cm at most.

Namely, the conventional method forms the cracks at the plating layer surface by releasing the internal stress in the plating layer with etching by the second reverse current treatment, and herein the internal residual stress in the plating layer is so great that the width of the opening of cracks is large at the moment the releasing of the internal stress is done by etching. Also, the number of cracks depends on the internal stress in the plating layer, so it is less than 100/cm.

Also, according to the method of present invention, as apparent from FIG. 8, the increasing rate of the number of micro-cracks relative to the catalyst content becomes blunt around the 30 ml/L of the catalyst content, and it shows the maximum is expected to be about 1300/cm. Thus, since the catalyst content of 35 ml/L or more could not increase the number of cracks and would rather cause an improper roughness of the plating layer surface, it is preferable that the content of catalyst is set to be 35 ml/L or less.

Meanwhile, although the number of cracks set to be 400/cm or less by reducing the catalyst content, this would deteriorate the current efficiency. Thus, it may be difficult to obtain the cracks with the medium number in the range of 100 to 400/cm, so there would be a concern in the stable quality. Therefore, it is preferable that the catalyst content is 10 ml/L or more and the number of cracks is 400/cm or more.

<Case of Cr Plating>

The Cr plating was carried out under the conditions shown in the above-described CrMo plating composition (Table 1) with a zero content of sodium molybdate. FIGS. 9 through 12 are photomicrographs of the plating layers with different catalyst contents. The Cr plating also shows, like the CrMo plating, that the more the catalyst content is, the narrower the opening width of micro-cracks is and the greater the crack number is.

<Relationships Between the Catalyst Content and the XRD Peak Intensity Ratio>

The CrMo plating layers were formed on the steel work surface respectively by the conventional plating with the zero content of the catalyst (organic sulfonic acid) and the plating of the present invention with 30 ml/L content of the catalyst according to the plating bath composition shown in Table 1, under the conditions shown in Table 2. And, the measurement of XRD (X-ray diffraction) was carried for the both.

Figure 13A:
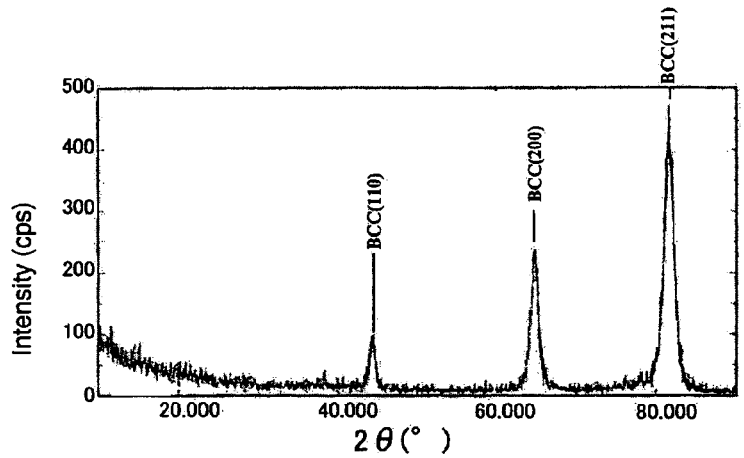
FIGS. 13A, 13B and 13C are X-ray diffraction charts of the conventional plating layer and the present invention.
Figure 13B:
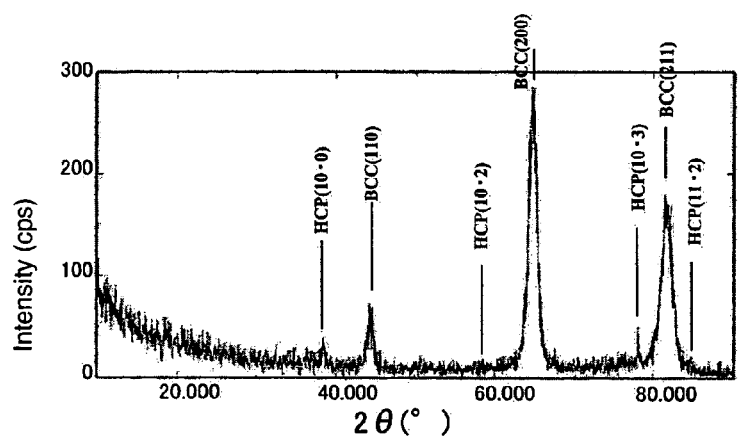
Figure 13C:
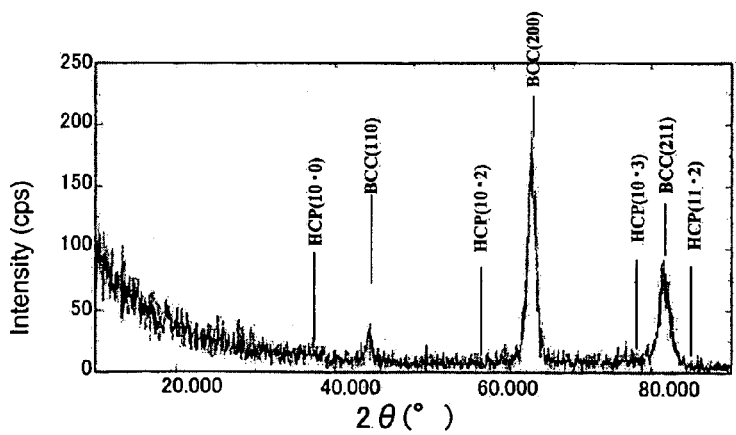

FIG. 13A is the X-ray diffraction chart of the layer according to the conventional plating. FIG. 13B is the X-ray diffraction chart of the layer according to the plating of the present invention. FIG. 13C is the X-ray diffraction chart of the layer formed according to the plating of the present invention, to which grinding was applied.

In the layer formed according to the conventional plating (FIG. 13A), the intensity of the diffraction peak of the (211) plane of BCC-structure was greater than that of the diffraction peak of the (200) plane of BCC-structure. Conversely, in the layer according to the plating of the present invention (FIG. 13B), the intensity of the diffraction peak of the (200) plane of BCC-structure was greater than that of the diffraction peak of the (211) plane of BCC-structure. Further, the diffraction peak of the (10·0) plane and (10·3) plane of HCP-structure appeared, which did not appear in the conventional plating. FIG. 13C will be described later.

Figure 14:
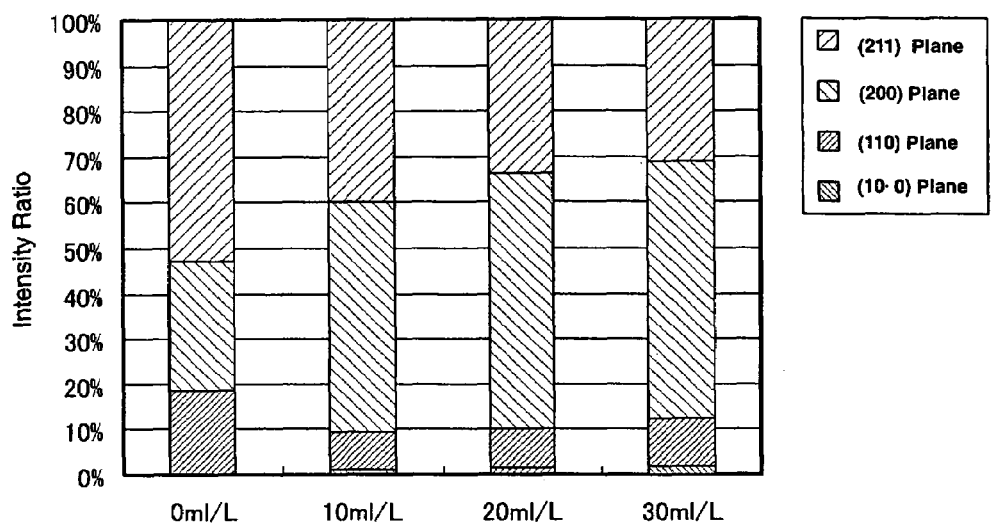
FIG. 14 is a graph showing an intensity ratio of a diffraction peak of Cr crystal planes of respective plating layers with different catalyst contents according to a XRD measurement.

FIG. 14 shows results of the intensity ratio of the diffraction peak of Cr crystal planes of respective plating layers with catalyst contents of zero, 10 ml/L, 20 ml/L and 30 ml/L according to the XRD measurement (herein, the total of the diffraction peak intensity is set to 100). This ratio shows which crystal plane is oriented to the plating layer surface with what ratio. Herein, the ratio of the (10·3) plane of HCP-structure in the figure contains ratios of other planes, such as the (10·3) plane of HCP-structure.

According to the figure, the greater the catalyst content is, the smaller the ratio of the (211) plane of BCC-structure is and the greater the ratio of the (200) plane of BCC-structure is. Also, its increasing rate becomes blunt over the 20 ml/L of the catalyst content. The ratio of the intensity Ib of the diffraction peak of the (200) plane relative to the intensity Ia of the diffraction peak of the (211) plane for the zero catalyst content, namely the peak intensity ratio Ib/Ia is about 0.54.

The peak intensity ratio lb/la for the 10 ml/L catalyst content is about 1.25, and the one for the catalyst content of 20 ml/L or 30 ml/L is about 1.8.

Figure 1:
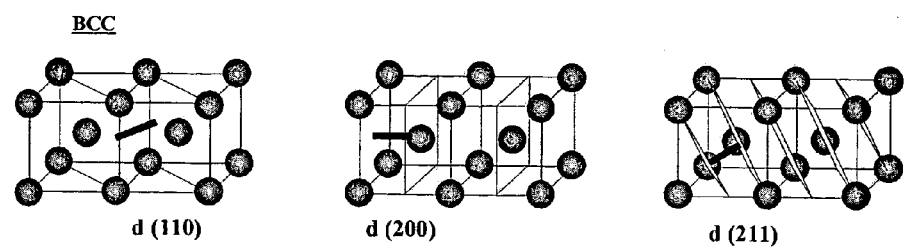
FIG. 1 is a diagram showing crystal lattices of Cr.

As described referring to FIG. 1, since the plane (200) has its longer plane distance d than the plane (211), the sticking force of the chrome oxide formed on the plating layer surface with the greater peak intensity ratio lb/la according to the present invention is weaker than that according to the conventional plating. Thus, the chrome oxide film according to the present invention peals easily by the sliding contact with atoner member, i.e., its friction force becomes small.

Figure 15:
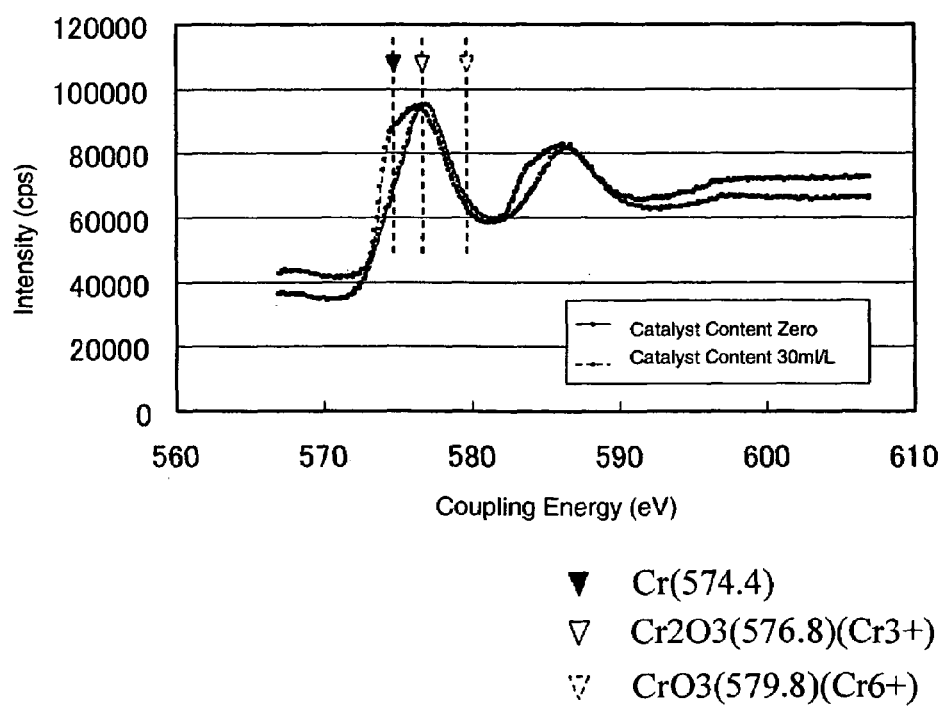
FIG. 15 is a graph showing results of XPS analysis after a sliding test for the conventional plating layer and the present invention.

FIG. 15 shows results of XPS analysis (X-ray spectroscopic analysis) after the sliding test for the conventional plating layer with the zero catalyst content and the present invention with the 30 ml/L catalyst content. According to the figure, the present invention with the 30 ml/L catalyst content shows its greater intensity than the conventional plating layer at 574.4 eV resulting from Cr. That is, Cr is exposed or the chrome oxide layer becomes thinner in the layer of the present invention, namely, the chrome oxide film according to the present invention peals easily. This may be because the peak intensity ratio lb/la is great.

<Extremely-Micro-Cracks with HCP-Structure>

Figure 16:
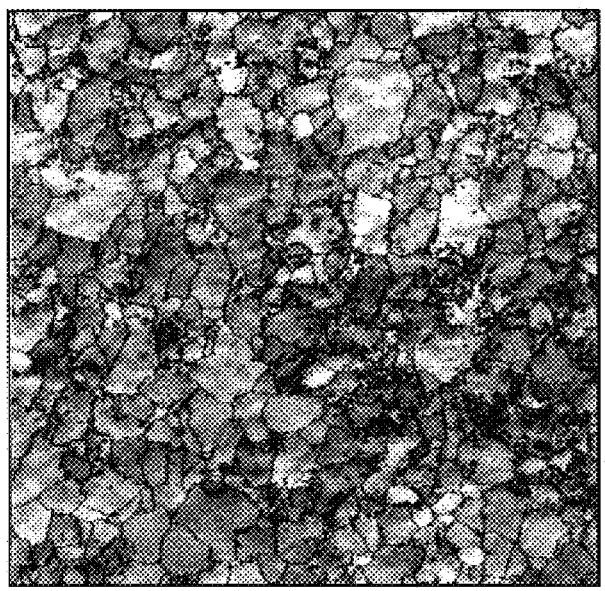
FIG. 16 is a photomicrograph showing EBSP of the plating layer of the present invention.
Figure 17:
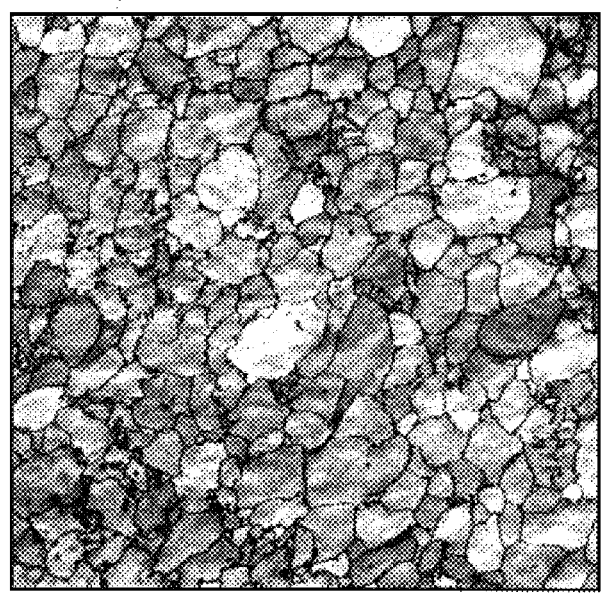
FIG. 17 is a photomicrograph showing EBSP of the conventional plating layer.

As apparent from the chart of X-ray diffraction in FIG. 13B, the crystal with HCP-structure appears at the plating layer according to the present invention (with 30 ml/L catalyst content). FIG. 16 shows EBSP (Electron Back Scattering Diffraction Patterns) of the plating layer. This shows the multi-crystal containing small and large crystal particles. Relatively large crystal particles are crystal with BCC-structure and small black particles are crystals with HCP-structure. Many small crystal particles with HCP-structure are located around the crystal with BCC-structure. Meanwhile, FIG. 17 shows EBSP of the conventional plating layer with the zero catalyst content. Herein, the crystal particles with BCC-structure also appear like the layer according to the present invention, but only few crystal particles with HCP-structure appear.

Figure 18:
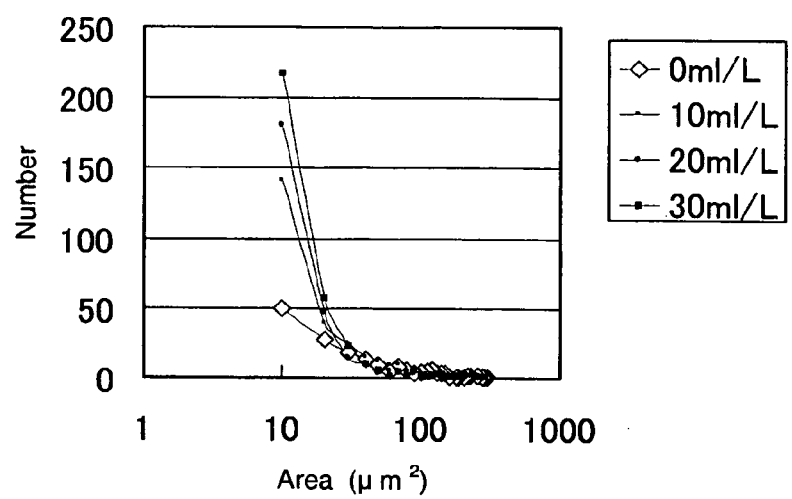
FIG. 18 is a graph showing the number of respective crystal particles in different area of respective plating layers with different content of catalyst.

FIG. 18 shows distribution of large and small crystal particles that appear in the area of 22500 $\mu m^2$ (picture area shown in FIGS. 16, 17) of respective plating layers with different content of catalyst (organic sulfonic acid), which was obtained through EBSP image analysis. Herein, particles appearing in the area of less than 10 $\mu m^2$ are shown as those appearing in the area of 10 $\mu m^2$. Also, since the area where many small particles appear intensively were counted as one portion, the number of crystal particles appearing in the area of less than 10 $\mu m^2$ is actually grater than that shown in FIG. 18. It is apparent from this figure that the greater the catalyst content is, the greater the number of the small crystal particles with HCP-structure is.

Figure 19:
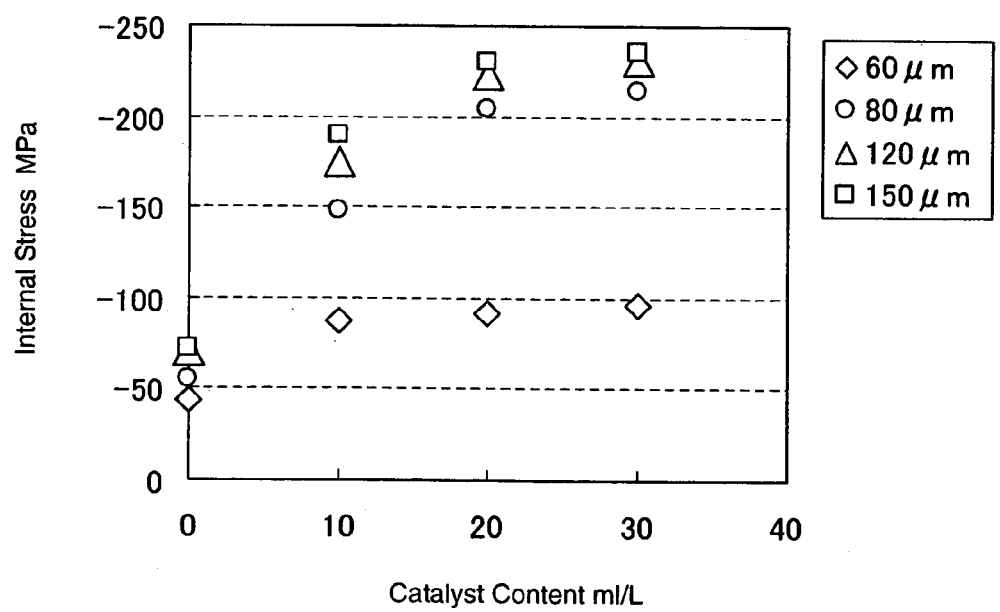
FIG. 19 is a graph showing relationships between the content of catalyst and the internal stress of the plating player.

FIG. 19 shows a graph of the internal stress of respective plating layers with different contents of catalyst (organic sulfonic acid) that was obtained from the results of X-ray diffraction. Herein, figures of 60-150 $\mu m$ in the right column show the thickness of plating layer. It is apparent from the figure that the greater the catalyst content is, the grater the internal stress of the plating layer is. This may be because the speed of the crystal deposition increases according to the increase of the catalyst content, so the releasing of stress does not become easier. Also, the crystal particles with HCP-structure may be formed at the area of the crystal with BCC-structure, where the stress concentration occurs. Further, it is apparent that the grater the layer thickness is, the greater the internal stress is, and the layer thickness of 80 $\mu m$ or more provides the stable internal stress.

Figure 20:
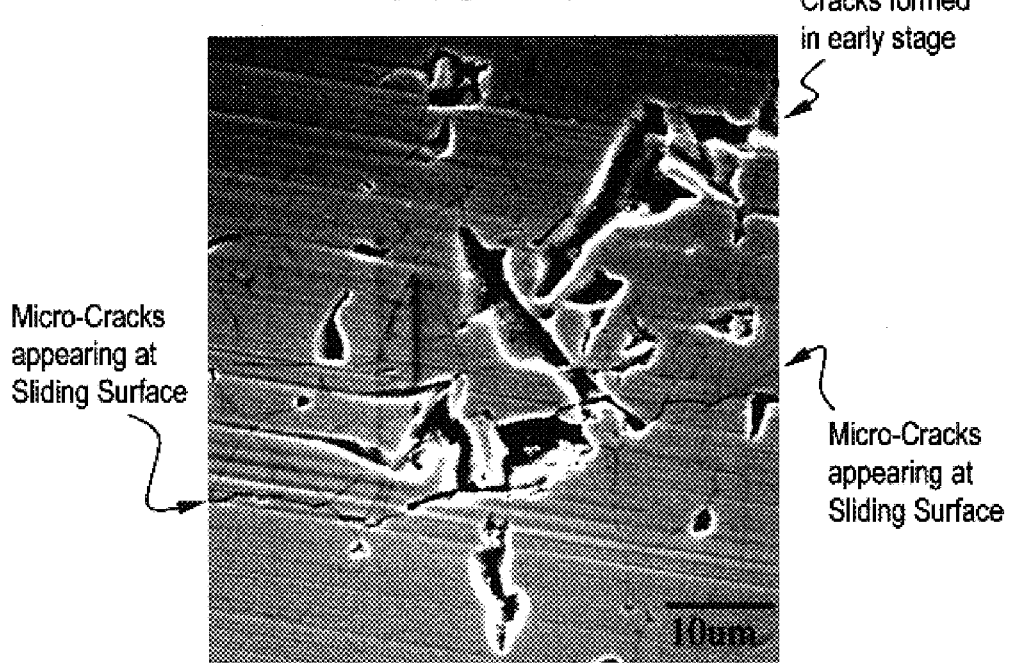
FIG. 20 is a photomicrograph of the plating layer of the present invention, to which grinding has been applied.

FIG. 20 is a photomicrograph of the plating layer of the present invention with the catalyst content of 30 ml/L, to which grinding has been applied. Large cracks in the figure are micro-cracks that had been formed in the early stage (before grinding), and many cracks that appear to be fine lines are extremely-micro-cracks that were formed by grinding.

FIG. 13C is a X-ray diffraction chart of the plating layer of the present invention after grinding. It is apparent by comparing the X-ray diffraction chart of the plating layer before grinding shown in FIG. 13B, that the diffraction peak with plane of crystal with HCP-structure has disappeared or changed to a broad shape with grinding. Judging from this and the observation results of the photomicrograph of FIG. 20, it may be considered that the above-described extremely-micro-cracks were formed by the disappearance of the crystal particles with HCP-structure. That is, the crystal particles with HCP-structure disappeared to release the internal stress when the plating layer received an outer force with grinding, so the extremely-micro-cracks were formed from these crystal particles.

Figure 21:
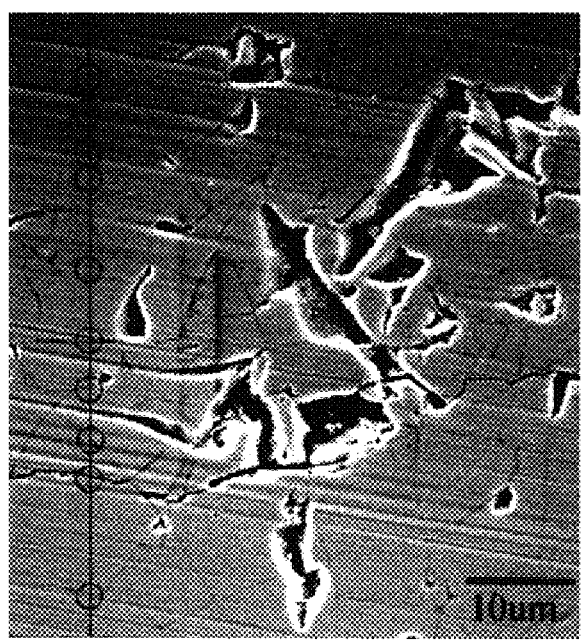
FIG. 21 is a photomicrograph of FIG. 20 with circular marks drawn on cracks that cross a straight line.

The width of the above-described extremely-micro-cracks is less than 0.1 $\mu m$, and as shown with circular marks on cracks that cross a straight line in FIG. 21, the number of the extremely-micro-cracks per 1 cm is about 1500/cm (3/20 $\mu m$)-3000/cm (6/20 $\mu m$).

Thus, according to the present invention, in addition to the above-described easy pealing of the chrome oxide with the greater peak intensity ratio lb/la, many extremely-micro-cracks are formed from the crystal particles with HCP-structure with the grinding or friction with another member. Thereby, the plating layer of the present invention can provide the lower frictional property and the superior lubricating property.

<Relationships Between the Area of Oil Sumps and the Seizure Limit>

There were provided works having different kinds of CrMo plating layers formed thereon that were formed according to the present invention by changing the catalyst contents in the above-described CrMo plating bath composition (Table 1). Namely, these CrMo plating layers have micro-cracks with the width of 0.1 $\mu m$ or more and 3 $\mu m$ or less, but the number of the micro-cracks is different, namely 400/cm, 1000/cm and 1200/cm. Meanwhile, there were provided works having one kind of CrMo plating layer formed thereon that was formed by the conventional plating with the zero catalyst content. This CrMo plating layer had micro-cracks with the number of 400/cm. Then, the grinding finishing was applied to each surface of plating layers of these works, and then the second reverse current treatments (the current density of 50 A/dm$^2$) were applied to respective works by changing the treatment time. Thus, there were provided some test pieces having different area ratios of oil sumps, respectively. Herein, the area ratio of oil sumps means a ratio of the area that the micro-cracks exposed on the plating layer surface cover relative to a whole area of the plating layer surface. Each plating layer of the test pieces had the thickness of 150 $\mu m$, the hardness of about Hv 1000, and the CrMo plating with the Mo deposition amount of 0.55%.

Herein, in the conventional plating, the CrMo plating layer was formed with the conditions shown in Tables 1 and 2, except the zero catalyst content and the direct current treatment of 30.3 A/dm$^2$×6.5 hours.

Figure 22:
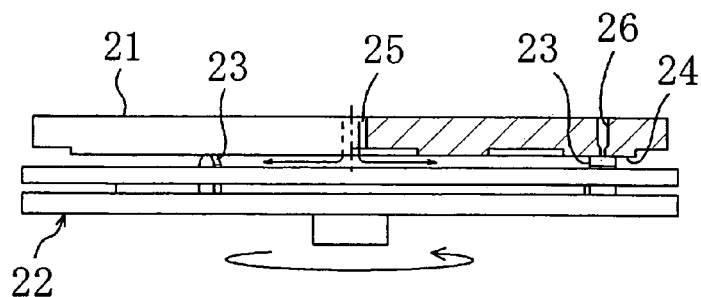
FIG. 22 is an elevation view of a tester for tests of seizure limit and friction/wear property.

The seizure limit of these test pieces was measured by using a tester shown in FIG. 22. In the figure, a reference numeral 21 denotes a test piece, and a reference numeral 22 denotes a rotational support base, on which sliding pieces 23 that are made of steel are fixed. A plating layer 24 is formed on the bottom plane of the test piece so as to be located in a ring shape near a periphery of the test piece. At a central portion of the test piece 21 is formed an air supply port 25 so as to penetrate the test piece. A lubricating-oil supply port 26 is formed near the periphery of the test piece so as to test piece, where the plating layer 24 is located. And, three sliding pieces 23 are fixed to the rotational support base 22 at regular intervals of 120 degree in the peripheral direction so as to project upward from the support base 22. The test piece 21 is placed on the three sliding pieces 23.

The measurement was carried out in the following way. Namely, the rotational support base 22 were rotated while the air were supplied via the air supply port with the air pressure of 2.5 kg/cm$^2$, and the lubrication oil were supplied via the lubricating-oil supply port 26 at the flow speed of 25 μL/min. Herein, the pressing load of the test piece 21 against the sliding pieces 23 were increased stepwise.

Figure 23:
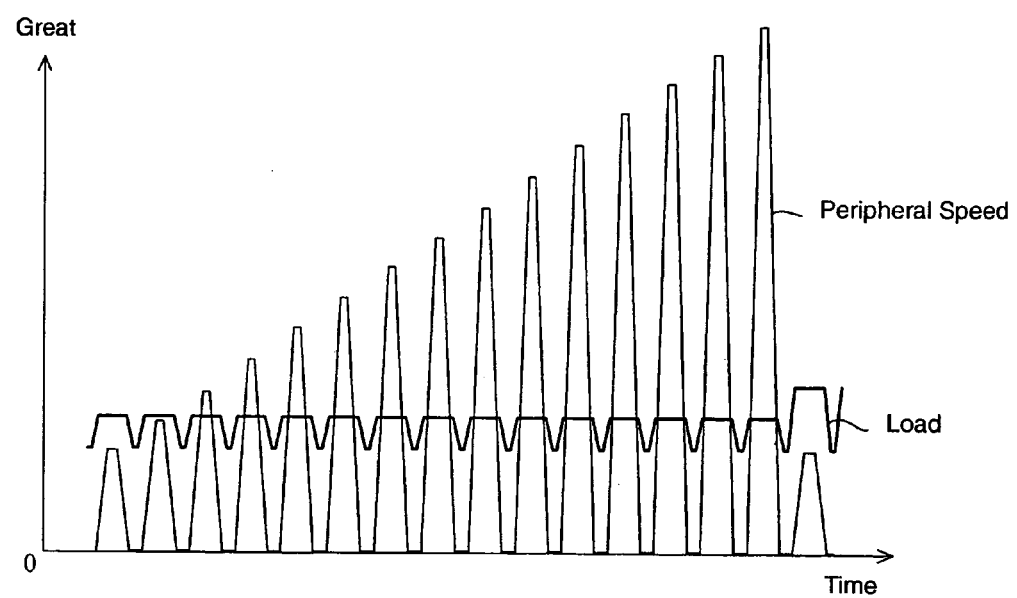
FIG. 23 is a graph showing schematically changes of the sliding speed and the load of a sliding piece for the test.

Herein, the rotation of the rotational support base 22 was conducted cyclically as schematically shown in FIG. 23. Namely, the peripheral speed of the sliding pieces 23 was increased from zero to a target speed in 10 seconds, the speed was maintained for 20 seconds, and then was dropped to zero. This cyclic pattern was repeated. Herein, the target speed was increased stepwise from 1.25 ml/s up to 20 m/s with the increasing rate of 1.25 m/s. After the target speed reached 20 m/s, the target speed was reduced back to 1.25 m/s, and likewise the speed was increased again. This cyclic pattern was provided to imitate an actual condition of the engine where the seal member slides on the rotor housing or the cylinder. The condition of this pattern is rather sever, because the pattern includes the zero peripheral speed, which may cause a situation where the lubricating oil film is broken.

Meanwhile, the load was also cyclically changed, as schematically shown in FIG. 23, corresponding to the above-described cyclic pattern. The target load was increased stepwise from 50 N up to 200 N with the increasing rate of 250 N.

The friction torque generating between the sliding pieces 23 and the plating layer 24 of the test piece 21 was measured during the testing with this stepwise increasing of the peripheral speed and the load. And, the peripheral speed and the load were measured at the point where the above-described torque increased quickly and it was determined the increased torque would not dropped to its initial state. These two measured speed and load values were multiplied, and this obtained value by multiplication was used to represent the seizure limit.

Figure 24:
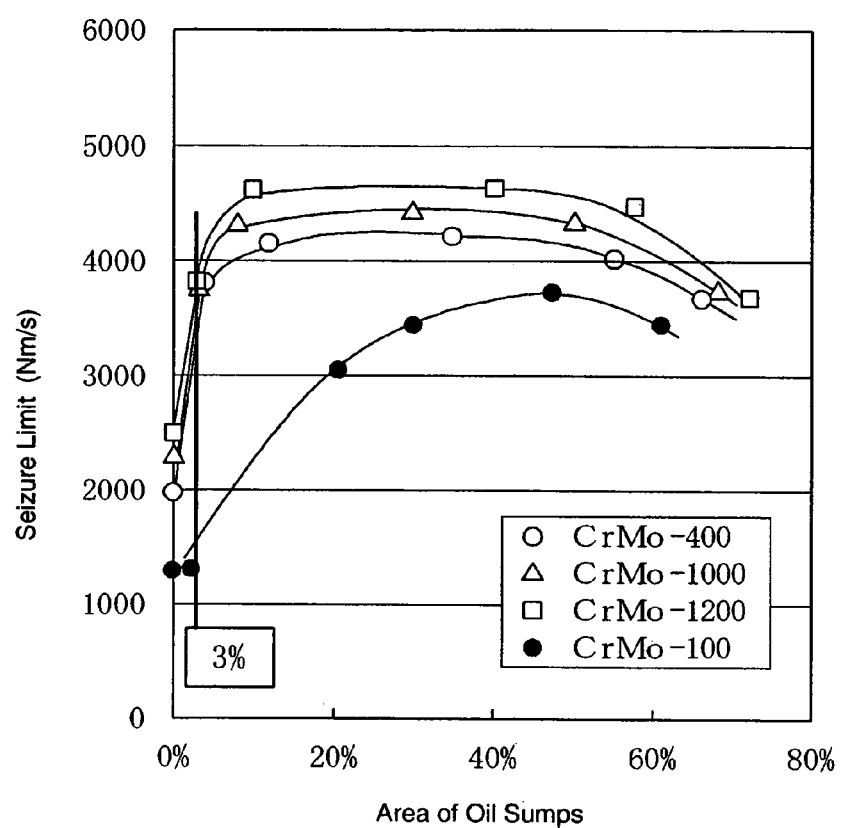
FIG. 24 is a graph showing relationships between the area ratio of oil sumps and the seizure limit of the plating layer of the present invention and the conventional plating player.

The test results are shown in FIG. 24. Herein, CrMo-100 denotes the test piece according to the conventional plating, and CrMo-400, CrMo-1000 and CrMo-1200 are test pieces according to the plating of the present invention. Herein, the figures mean the number of micro-cracks per 1 cm. The test pieces according to the conventional plating (CrMo-100) showed that the seizure limit did not improve with the enlargement of the area ratio of oil sumps from 0% (with micro-cracks destroyed by grinding) to 20%. The seizure limit rose slightly at nearly 50% of the area ratio of oil sumps but that was not sufficiently high. And, as the area ratio of oil sumps became greater, the sliding resistance increased, namely the friction loss increased (this will be apparent from a friction test described later).

In contrast, the test pieces according to the plating of the present invention showed that the seizure limit at 3% of the area ratio of oil sumps were higher than that at nearly 50% of the area ratio of oil sumps of the test piece according to the conventional plating, and maintained their high level seizure limit over 3-60% regardless of the area ratio of oil sumps.

This may be considered as follows. The lubricating oil supplied to the sliding surface get into the cracks exposed to the plating layer surface. Since so many micro-cracks with the width of less than 0.1 μm are formed at the plating layer according to the present invention, compared with the cracks at the plating layer according to the conventional plating, the lubricating property becomes better and also the improper temperature increase can be suppressed with the cooling function by the lubricating oil spread widely in the micro-cracks.

<Relationships Between the CrMo Alloy/the Crack Number and the Wear/Friction>

There were provided test pieces having different kinds of CrMo plating layers formed according to the present invention by changing the catalyst contents in the above-described CrMo plating bath composition (Table 1). Namely, the test pieces according to the present invention had the CrMo plating layers having micro-cracks with the number of 400/cm, 1000/cm and 1200/cm, respectively. Also, there were provided test pieces according to the conventional plating, which were the CrMo plating layer formed with the zero catalyst content and having micro-cracks with the number of 400/cm, and the Cr plating layer formed with the zero sodium molybdate content in the above-described CrMo plating bath composition (Table 1). Each plating layer of the test pieces had the thickness of 150 μm, and the hardness of about Hv 1000. Also, the area ratio of oil sumps was set at 20% by second reverse current treatment after the grinding finishing. The CrMo plating had the Mo deposition amount of 0.55%.

Then, the wear volume and the coefficient of friction of the above-described test pieces and seals (sliding pieces) were measured by using the tester shown in FIG. 22.

In the wear test, the peripheral speed of the sliding pieces 23 was increased stepwise from 1.25 m/s up to 10 m/s with the increasing rate of 1.25 m/s, and the rising time was set at 10 sec, like the seizure limit test, but the maintained time was set at 10 sec. Likewise, the load was increased stepwise from 50 N up to 200 N, but the increasing rate was set at 50 N. The stepwise increasing of the peripheral speed and the load was carried out twice. The wear test was carried out under the lubricating condition, but the friction test was carried out under no lubricating condition with the load of 50 N and the peripheral speed of 1.25 m/s.

Figure 25:
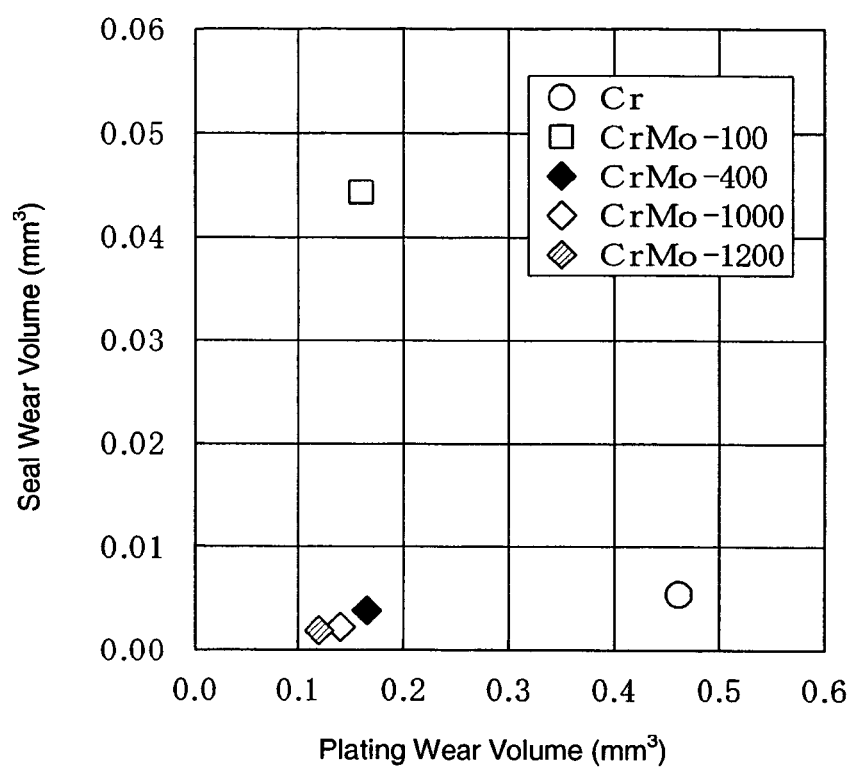
FIG. 25 is a graph showing relationships between the plating worn volume and the seal worn volume of the plating layer of the present invention and the conventional plating player in a lubricating wear test.
Figure 26:
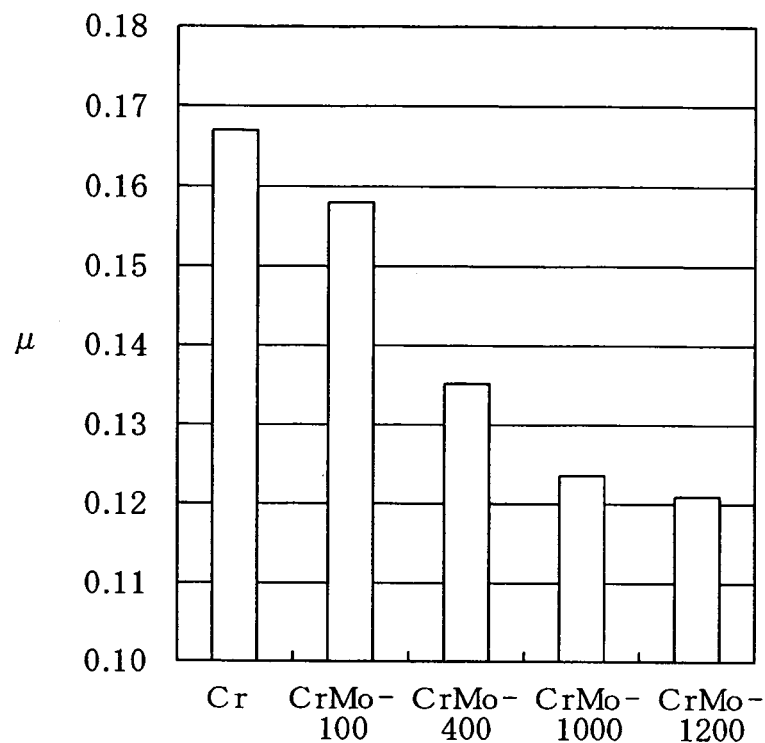
FIG. 26 is a graph showing the coefficient of friction of the plating layer of the present invention and the conventional plating player in a non-lubricating friction test.

The results of the wear test are shown in FIG. 25, and the results of the friction test are shown in FIG. 26. Herein, Cr and CrMo-100 denote the test pieces according to the conventional plating, and CrMo-400, CrMo-1000 and CrMo-1200 are test pieces according to the plating of the present invention. The figures mean the number of micro-cracks per 1 cm.

According to the wear test results of FIG. 25, the conventional plating Cr showed the seals with a small amount of wear, and the plating layer with a large amount of wear. Meanwhile, the CrMo plating according to both the conventional plating and the present invention showed the plating layers with a small amount of wear. Herein, the conventional plating. CrMo-100 showed the seals with the large amount of wear, whereas the present invention plating CrMo-400, CrMo-1000 and CrMo-1200 showed not only the plating layers with the small amount of wear but also the seals with the small amount of wear.

This may be because since there exist many micro-cracks and many extremely-micro-cracks, the frictional heat is properly cooled by the lubricating oil spread widely in these micro-cracks and the lubrication is effectively attained by the lubricating oil supplied from the cracks.

According to the friction test results of FIG. 26, the CrMo plating showed that their coefficients of friction are lower than that of the conventional plating Cr, and a tendency that the greater the number of the micro-cracks is, the smaller the coefficient of friction is. The reason for the lower frictional coefficient of the CrMo plating may be that the Mo added strengthens the plating layer and makes fine crystal particles, so the adhesion wear between the plating layer and the seals is suppressed. Also, the reason for the CrMo plating with some content of catalyst according to the present invention having the frictional coefficient smaller than that of the CrMo plating with the zero content of catalyst may be that the increased deposition speed by the added catalyst promotes making of fine crystals, letting the chrome oxide film to peal easily and making the orientation of crystals random, so the adhesion wear is suppressed.

<Relationships Between the Area of Oil Sumps/the Crack Width and the Coefficient of Friction>

There were provided test pieces of CrMo plating layers having micro-cracks with the number of 400/cm, 1000/cm and 1200/cm formed according to the present invention by changing the catalyst contents and test pieces of CrMo plating layers having micro-cracks with the number of 100/cm formed according to the conventional plating. Then, likewise by applying the second reverse current treatment with adjusted treatment time to each test piece after the grinding finishing, there were provided test pieces with the different area of oil sumps and the width of cracks. And, the coefficient of friction μ of each test piece 21 was measured in the lubricating test using the tester shown in FIG. 22. Herein, the peripheral speed of the sliding pieces 23 is 10 m/s, the load is 1 MPa, and the temperature of the lubricating oil is 100° C.

Figure 27:
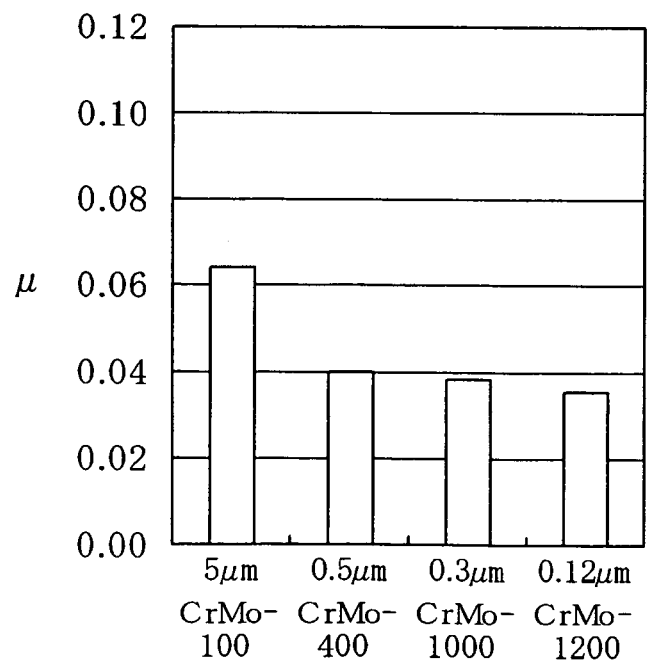
FIG. 27 is a graph showing the coefficient of friction of the plating layer of the present invention and the conventional plating player in the lubricating test with a 3% of the area ratio of oil sumps.
Figure 28:
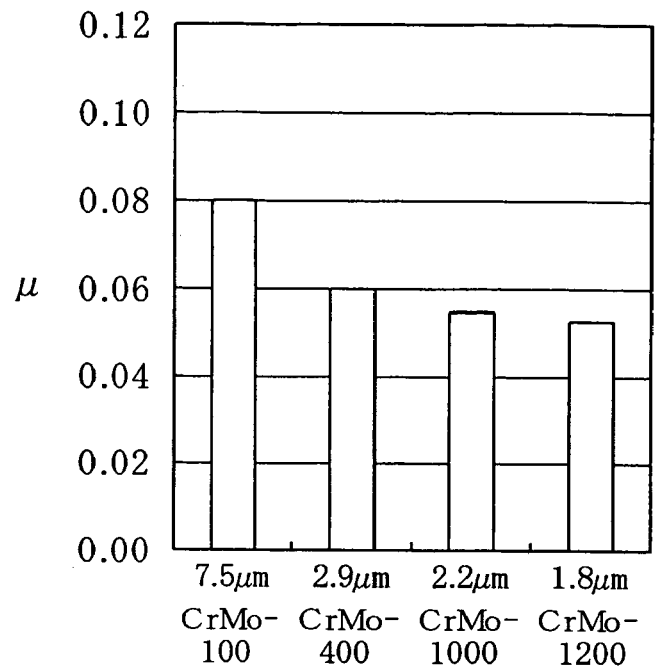
FIG. 28 is a graph showing the coefficient of friction of the plating layer of the present invention and the conventional plating player in the lubricating test with a 20% of the area ratio of oil sumps.
Figure 29:
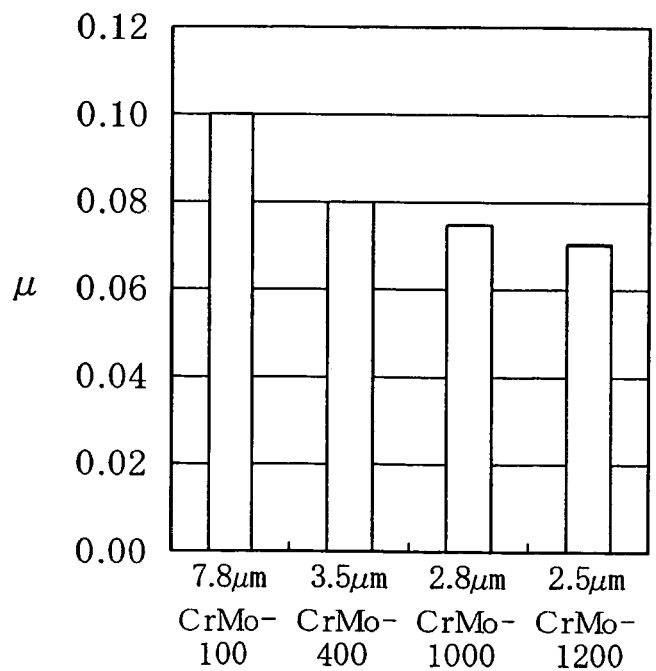
FIG. 29 is a graph showing the coefficient of friction of the plating layer of the present invention and the conventional plating player in the lubricating test with a 60% of the area ratio of oil sumps.

The test results are shown in FIG. 27 through 29. FIG. 27 shows the area ratio of oil sumps of 3%, FIG. 28 shows the area ratio of oil sumps of 20%, and FIG. 29 shows the area ratio of oil sumps of 60%, respectively. Herein, Cr and CrMo-100 denote the test pieces according to the conventional plating, and CrMo-400, CrMo-1000 and CrMo-1200 are test pieces according to the plating of the present invention. The figures mean the number of micro-cracks per 1 cm. The figures presented by the unit μ show the width of the opening of cracks.

According to FIGS. 27 through 29, the test pieces with the same crack number showed that the coefficient of friction became smaller as the area of oil sumps got smaller, and the test pieces with the same area of oil sumps showed that the coefficient of friction became smaller as the opening width of cracks got narrower (as the crack number increased). This is because that the micro-cracks function as oil sumps but if the area becomes too larger, the lubricating oil goes away into the cracks, thereby causing the lubricating-oil film being broken. In other words, the reason for the coefficient of friction becoming smaller with the area of oil sumps getting smaller is that the ratio of hydraulic lubrication increases. Also, the reason for the difference in the coefficient of friction occurring for the test pieces with the same area of oil sumps is that the wider opening of cracks causes the lubricating-oil film being broken easily. Also, since the coefficient of friction of the test pieces with the area ratio of oil sumps of 20% according to the present invention was smaller than that of the test pieces with the area ratio of oil sumps of 3% according to the conventional plating, it is preferable that the area ratio of oil sumps is 20% or less.

Accordingly, since the present invention provides the superior effect of the low friction at the lubricating-oil temperature of 100° C., it is preferable that the opening width of micro-cracks is set to be 0.12 μm or more and 3.0 μm or less for the use at the lubricating-oil temperature of 100° C. or less where the engine oil can form the oil film easily.

Further, since the present invention increases the ratio of the hydraulic lubrication as described above and provides the low friction even over the area from the boundary lubrication to the mixed lubrication which is apparent from the previous friction test results with zero lubrication, the present invention is advantageous to decreasing the friction loss and improving the seizure limit.

<Grinding>

The finishing treatment by grinding can make the micro-cracks located in the layer be exposed to the layer surface over the specified area ratio and form the extremely-micro-cracks from the crystal particles with HCP-structure. Herein, it is preferable that the surface roughness is Ra 2.0 μm or less, thereby preventing the lubricating oil film from being broken in the early stage. Meanwhile, it may be necessary to prevent the cracks from being destroyed with a plastic flow of materials at the layer surface when the grinding is applied. Herein, the honing treatment may be effective to properly adjust working tolerance on the plating layer surface with appropriate working conditions (the grindstone's moving amount, rotational speed, materials), so the plastic flow can be suppressed and the cracks can be properly exposed to the surface.

Figure 30:
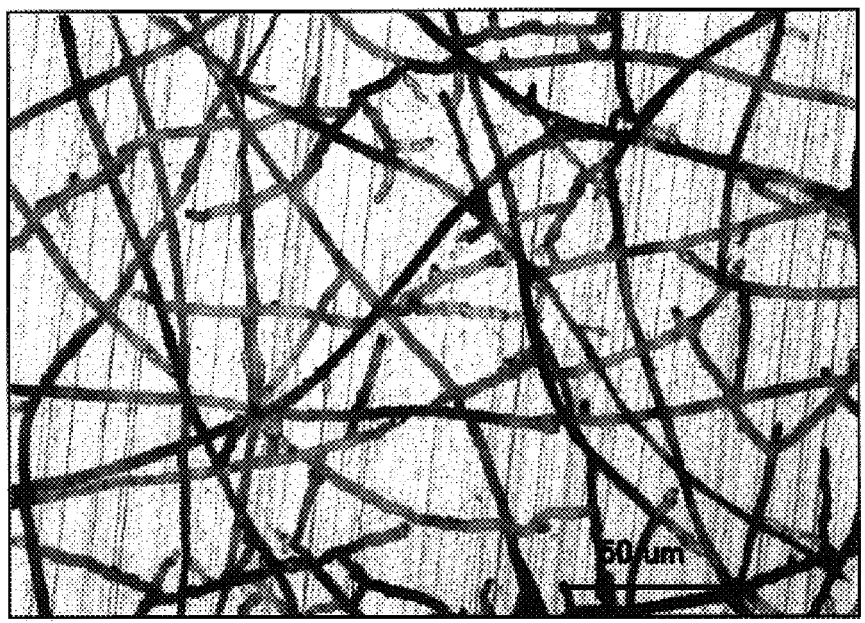
FIG. 30 is a photomicrograph of the plating layer in which cracks remain after honing.
Figure 31:
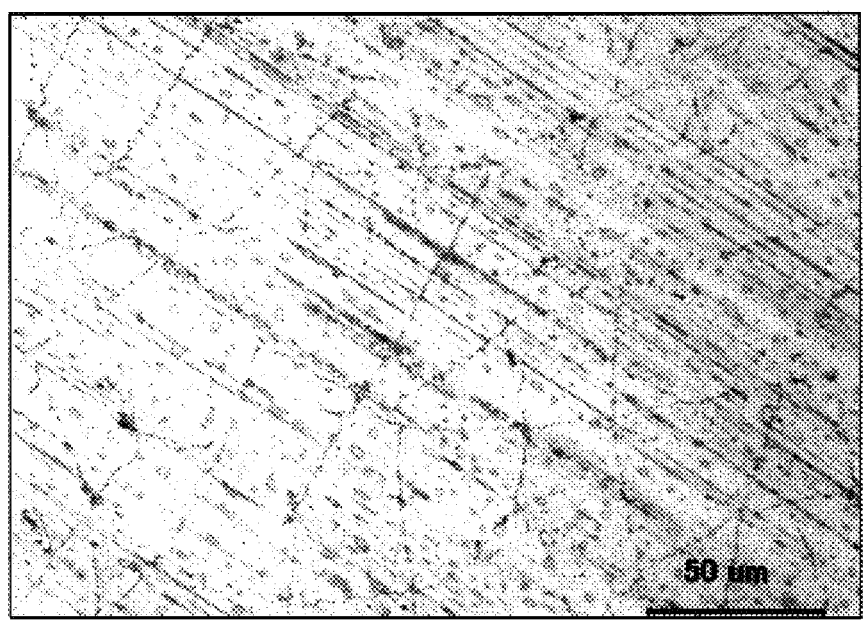
FIG. 31 is a photomicrograph of the plating layer in which cracks are destroyed by grinding.

FIG. 30 shows a sample in which the cracks were able to be remained by using the honing treatment, and FIG. 31 shows a sample in which the cracks were destroyed with the plastic flow of material at the plating layer surface by the grinding.

The present invention should not be limited to the above-described embodiments and any other modifications or improvements may be applied within the scope of the present invention.

What is claimed is:

1. An article including a sliding portion on which a plating layer is disposed, the plating layer comprising Cr that is electrolytically-deposited in a plating bath containing Cr, wherein said plating bath contains organic sulfonic acid, said plating layer has micro-cracks formed at the surface thereof, whose width is 0.1 μm or more and 3 μm or less and whose number per a unit length is 400/cm or more and 1300/cm or less, and the surface of the plating layer has more than 1 of an intensity ratio of a X-ray diffraction peak of (200) plane of Cr crystal with BCC-structure relative to that of (211) plane of Cr crystal with BCC-structure.

2. The article of claim 1, wherein said plating bath further contains Mo, and said plating layer comprises CrMo alloy.

3. The article of claim 1, wherein the surface of said plating layer is ground.

4. The article of of claim 3, wherein the surface of said plating layer further has extremely-micro-cracks exposed thereon, whose width is less than 0.1 μm and whose number per a unit length is 1500/cm or more and 3000/cm or less.

5. The article of claim 4, wherein said micro-cracks with the width of 0.1 μm or more and 3 μm or less cover an area of 3% or more and 20% or less of a whole area of the surface of the plating layer.

6. The article of claim 1, wherein said article is a combustion housing of an internal combustion engine.

7. An article including a sliding portion on which a plating layer is disposed, the plating layer comprising Cr that is electrolytically-deposited in a plating bath containing Cr, wherein said plating bath contains organic sulfonic acid, and at the surface of said plating layer are provided micro-cracks, whose width is 0.1 μm or more and 3 μm or less and whose number per a unit length is 400/cm or more and 1300/cm or less, and extremely-micro-cracks, whose width is less than 0.1 μm and whose number per unit length is 1500/cm or more and 3000/cm or less.

* * * * *